(12) United States Patent
Schmidt et al.

(10) Patent No.: US 7,700,002 B2
(45) Date of Patent: Apr. 20, 2010

(54) ILLUMINATION SYSTEM COMPRISING A RADIATION SOURCE AND FLUORESCENT MATERIAL

(75) Inventors: Peter Schmidt, Aachen (DE); Thomas Justel, Witten (DE); Henning Hoppe, Kirchanschoring (DE); Wolfgang Schnick, Gauting (DE); Walter Mayr, Alsdorf (DE)

(73) Assignees: Koninklijke Philips Electronics N.V., Eindhoven (NL); Philips Lumileds Lighting, US, LLC, San Jose, CA (US)

( * ) Notice: Subject to any disclaimer, the term of this patent is extended or adjusted under 35 U.S.C. 154(b) by 777 days.

(21) Appl. No.: 11/569,182

(22) PCT Filed: May 23, 2005

(86) PCT No.: PCT/IB2005/051674

§ 371 (c)(1),
(2), (4) Date: Nov. 16, 2006

(87) PCT Pub. No.: WO2005/116163

PCT Pub. Date: Dec. 8, 2005

(65) Prior Publication Data

US 2008/0231171 A1    Sep. 25, 2008

(30) Foreign Application Priority Data

May 27, 2004    (EP) .................. 04102361

(51) Int. Cl.
C09K 11/08    (2006.01)
C09K 11/66    (2006.01)
H01J 1/62    (2006.01)
H01J 63/04    (2006.01)

(52) U.S. Cl. .................. 252/301.4 F; 252/301.4 H; 313/486; 313/487; 313/503

(58) Field of Classification Search .......... 252/301.4 F, 252/301.4 H; 313/486, 487, 503
See application file for complete search history.

(56) References Cited

U.S. PATENT DOCUMENTS 5,998,925 A    12/1999    Shimizu et al.

FOREIGN PATENT DOCUMENTS

| WO | 2004036962 A1 | 4/2004 |
|---|---|---|
| WO | 2005031797 A1 | 4/2005 |
| WO | 2005045881 A1 | 5/2005 |

OTHER PUBLICATIONS

B. Winkler, et al: Theoratical Study of the Structures and Properties of SrSiA1203N2 and Ce4'Si404N6!0, Chem Physics Letters, vol. 343, 2001, pp. 622-626, XP002340248.
Elisabeth Irran, et al: Ce4Si4O4N6O—A Hyperbolically Layered Oxonitridosilicate Oxide with an Ordered Distrubution of Oxygen and Nitrogen, Chem. Eur. J. vol. 6, No. 15, 2000, pp. 2714-2720, XP002340247.

*Primary Examiner*—C. Melissa Koslow
*Assistant Examiner*—Matthew E Hoban (57) ABSTRACT

The invention concerns an illumination system comprising a radiation source and a fluorescent material comprising at least one phosphor capable of absorbing part of the light emitted by the radiation source and emitting light of a wavelength different from that of the absorbed light; wherein said at least one phosphor is a yellow to red-emitting europium(II) activated halogeno-oxonitridosilicate of the general formula $Ea_x Si_y N_{2/3x+4/3y}:Eu_z O_a X_b$, wherein $1 \leq x \leq 2$; $3 \leq y \leq 7$; $0.001 \leq z \leq 0.09$, $0.005 < a \leq 5\, 0.05$, $0.01 < b \leq 0.3$, EA is at least one earth alkaline metal chosen from the group of calcium, barium and strontium and X is at least one halogen chosen from the group of fluorine, chlorine, bromine and iodine. The invention is also concerned with a red to yellow-emitting europium(II)-activated halogeno-oxonitridosilicate of the general formula $Ea_x Si_y N_{2/3x+4/3y}:Eu_z O_a X_b$, wherein $1 \leq x \leq 2$; $3 \leq y \leq 7$; $0.001 < z \leq 0.09$, $0.005 < a \leq 0.05$, $0.01 < b \leq 0.3$, EA is at least one earth alkaline metal chosen from the group of calcium, barium and strontium and X is at least one halogen chosen from the group of fluorine, chlorine, bromine and iodine, and a method of manufacturing same.

21 Claims, 4 Drawing Sheets

ILLUMINATION SYSTEM COMPRISING A RADIATION SOURCE AND FLUORESCENT MATERIAL

The present invention generally relates to an illumination system comprising a radiation source and a fluorescent material comprising a phosphor. The invention also relates to a phosphor for use in such an illumination system and a method of manufacturing such a phosphor.

More particularly, the invention relates to an illumination system and a fluorescent material comprising a phosphor for the generation of specific, colored light, including white light, by luminescent down conversion and additive color mixing based on an ultraviolet or blue radiation-emitting radiation source. The use of a light-emitting diode as a radiation source is especially contemplated.

Recently, various attempts have been made to make white light emitting illumination systems by using light emitting diodes as radiation sources. When generating white light with an arrangement of red, green and blue light emitting diodes, the problem encountered was that white light of the desired tone could not be generated due to variations in the tone, luminance and other factors of the light emitting diodes.

In order to solve this problem, various illumination systems have been developed until now, which convert the color of light emitting diodes by means of a fluorescent material comprising a phosphor to provide visible white light illumination.

Previous white light illumination systems have been based in particular either on the trichromatic (RGB) approach, i.e. mixing three colors, namely red, green and blue, in which case the latter component of the output light may be provided by a phosphor or by the primary emission of the LED or in a second, simplified solution, on the dichromatic (BY) approach, i.e. mixing yellow and blue colors, in which case the yellow secondary component of the output light may be provided by a yellow phosphor and the blue component may be provided by a phosphor or by the primary emission of a blue LED.

In particular, the dichromatic approach as disclosed in e.g. U.S. Pat. No. 5,998,925 uses a blue light emitting diode of an InGaN semiconductor combined with a $Y_3Al_5O_{12}$:Ce (YAG-Ce) phosphor. The YAG-Ce phosphor is coated onto the InGaN LED, and a portion of the blue light emitted from the LED is converted to yellow light by the phosphor. Another portion of the blue light from the LED is transmitted through the phosphor. Thus, this system emits both blue light, emitted from the LED, and yellow light emitted from the phosphor. The mixture of blue and yellow emission bands is perceived by an observer as white light with a typical CRI in the mid70ties and a color temperature Tc that ranges from about 6000 K to about 8000 K.

A problem with the LED according to U.S. Pat. No. 5,998,925 is that the "white" output light has an undesirable color balance for a true color rendition.

For true color rendition the figure of merit is the color rendering index (CRI). Color rendering index (CRI) measurement is a relative measurement of how the color rendition of an illumination system compares to that of a black body radiator. The CRI equals 100 if the color coordinates of a set of test colors being illuminated by the illumination system are the same as the coordinates of the same test colors being irradiated by a black body radiator.

True color rendition is important as colors serve in general to provide humans with various information on the visual environment. Colors play a particularly great role as providers of visual information to drivers of cars driving on roads or in tunnels. For example, it is very important to be able to distinguish between white and yellow lane markings in a tunnel, because it is paramount to know whether lane changing is permitted or not. However, on roads and in tunnels, which are illuminated by lamps of low CRI, it is difficult to distinguish between the white and yellow lane markings on the road surface.

Another important aspect in color recognition is that the red of a surface color should be recognized as red. Because red, in particular, is coded for important meanings such as danger, prohibition, stop and fire fighting. Therefore, an important point in improving the visual environment from the viewpoint of safety is an illumination that enhances red surfaces.

In the case that the (BY)-based light source of the dichromatic radiation type described above is used in such a situation, the problem encountered is that the probability of recognizing red, which is an important color for the indication of danger, is reduced due to a deficiency in the red region of the visible light spectrum (647-700 nm range). The red deficiency in the output white light causes illuminated red objects to appear less intense in color than they would be under a white light having a well-balanced color characteristic.

Improved efficiency and much improved color rendering ability may be possible with the dichromatic lamp spectrum according to the (BY)-approach having two emission bands: red at 590 to 630 and blue at 420 to 480 nm. These wavelengths are near to the peaks in the CIE tristimulus function which are used to define colors.

Unfortunately, a red emitting phosphor with an emission peak wavelength in the range of 590 to 630 nm, which demonstrates sufficient efficiency and stability, and which is also easy to manufacture, is hitherto not known.

Therefore, there is a need to provide new phosphors that are excitable by a radiation source of the near UV-to-blue range and emit in the visible yellow to red range.

Desirable characteristics for general purpose illumination systems are also high brightness at economical cost.

Thus, the present invention provides an illumination system comprising a radiation source and a fluorescent material comprising at least one phosphor capable of absorbing part of the light emitted by the radiation source and emitting light of a wavelength different from that of the absorbed light; wherein said at least one phosphor is an europium(II)-activated halogeno-oxonitridosilicate of the general formula $Ea_xSi_yN_{2/3x+4/3y}$:$Eu_zO_aX_b$, wherein $1 \leq x \leq 2$; $3 \leq y \leq 7$; $0.001 \leq z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine.

An illumination system according to the present invention can provide a composite white output light that is well-balanced with respect to color. In particular, the composite white output light has a greater amount of emission in the red color range than the conventional lamp. This characteristic makes the device ideal for applications in which a true color rendition is required.

Such applications of the invention include, inter alia, traffic lighting, street lighting, security lighting and lighting of automated factories, as well as signal lighting for vehicles.

What is especially contemplated for use as the radiation source is a light emitting diode.

According to a first aspect of the invention, a white light illumination system comprises a blue-light emitting diode having a peak emission wavelength in the range of 420 to 480 nm as a radiation source and a fluorescent material comprising at least one phosphor, that is a europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.03 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine.

Such an illumination system will provide white light during operation. The blue light emitted by the LED excites the phosphor, causing it to emit yellow light. The blue light emitted by the LED is transmitted through the phosphor and is mixed with the yellow light emitted by the phosphor. The viewer perceives the mixture of blue and yellow light as white light.

An essential factor is that the yellow to red phosphors of the europium(II)-activated halogeno-oxonitridosilicate type are so broad-banded that they also have a sufficient proportion of the emission throughout the whole spectral region.

According to one embodiment, the invention provides a white light illumination system comprising a blue-light emitting diode having a peak emission wavelength in the range of 420 to 480 nm as a radiation source and a fluorescent material comprising an europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 \leq b \leq 0.3$; EA is at least one earth alkaline metal chosen from the group of calcium, barium and strontium and X is at least one halogen chosen from the group of fluorine, chlorine, bromine and iodine and at least one second phosphor.

When the fluorescent material comprises a phosphor blend of a phosphor of the europium(II)-activated halogeno-oxonitridosilicate type and at least one second phosphor the color rendition of the white light illumination system according to the invention may be further improved.

In particular, the fluorescent material may be a phosphor blend comprising europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine and a red phosphor. Such a red phosphor may be selected from the group comprising Eu(II)-activated phosphors, selected from the group $(Ca_{1-x}Sr_x)S:Eu$, wherein $0 \leq x \leq 1$ and $(Sr_{1-x-y}Ba_xCa_y)_{2-z}Si_{5-a}Al_aN_{8-a}O_a:Eu_z$, wherein $0 \leq a < 5$, $0 < x \leq 1$, $0 \leq y \leq 1$ and $0 < z \leq 1$.

Alternatively, the fluorescent material may be a phosphor blend comprising a europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine and a yellow-to-green phosphor. Such a yellow to green phosphor may be selected from the group comprising $(Ba_{1-x}Sr_x)_2SiO_4:Eu$, wherein $0 \leq x \leq 1$, $SrGa_2S_4:Eu$, $SrSi_2N_2O_2:Eu$, $Ln_3Al_5O_{12}:Ce$ and YAG-Ce.

The emission spectrum of such a fluorescent material comprising additional phosphors has the appropriate wavelengths to obtain, together with the blue light of the LED and the yellow to red light of the europium(II)-activated halogeno-oxonitridosilicate type phosphor according to the invention, a high quality white light with good color rendering at the required color temperature.

According to another embodiment of the invention, there is provided a white light illumination system, wherein the radiation source is selected from the light emitting diodes having an emission with a peak wavelength in the UV-range of 200 to 420 nm and the fluorescent material comprises at least one phosphor, that is a europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine and a second phosphor.

In particular, the fluorescent material may comprise a white light emitting phosphor blend comprising a europium (II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine and a blue phosphor.

Such a blue phosphor may be selected from the group comprising $BaMgAl_{10}O_{17}:Eu$, $Ba_5SiO_4(Cl,Br)_6:Eu$, $CaLn_2S_4:Ce$, $(Sr,Ba,Ca)_5(PO_4)_3Cl:Eu$ and $LaSi_3N_5:Ce$.

A second aspect of the present invention provides an illumination system providing red to yellow light. Applications of the invention include security lighting as well as signal lighting for vehicles and traffic.

What is especially contemplated is a yellow to red light illumination system, wherein the radiation source is selected from the blue light emitting diodes having an emission with a peak wavelength in the range of 400 to 480 nm and the fluorescent material comprises at least one phosphor, that is a europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine.

What is also contemplated is a yellow to red light illumination system, wherein the radiation source is selected from the light emitting diodes having an emission with a peak wavelength in the UV-range of 200 to 420 nm and the fluorescent material comprises at least one phosphor, that is a europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine.

Another aspect of the present invention provides a phosphor capable of absorbing part of the light emitted by the radiation source and emitting light of a wavelength different from that of the absorbed light; wherein said phosphor is a europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine.

The fluorescent material is excitable by UV-A emission lines having wavelengths from 200 nm to 420 nm, but is excited with higher efficiency by blue light emitted by a blue light-emitting diode having a wavelength around 400 to 480 nm. Thus, the fluorescent material has ideal characteristics for conversion of blue light generated by a gallium nitride semiconductor light emitting component into white light.

These phosphors are broadband emitters, wherein the visible emission is so broad that there is no 80 nm wavelength range where the visible emission is predominantly located. These europium(II)-activated halogeno-oxonitridosilicate type phosphors emit a broad band in the red to yellow spectral range of the visible spectrum with a very high total conversion efficiency that can be as high as 90%.

Additional important characteristics of the europium(II)-activated halogeno-oxonitridosilicate type phosphors include 1) resistance to thermal quenching of luminescence at typical device operating temperatures (e.g. 80° C.); 2) absence of interfering reactivity with the encapsulating resins used in the device fabrication; 3) suitable absorptive profiles to minimize dead absorption within the visible spectrum; 4) a temporally stable luminous output over the operating lifetime of the device and; 5) compositionally controlled tuning of the phosphors' excitation and emission properties.

These europium(II)-activated halogeno-oxonitridosilicate type phosphors may also include ytterbium, samarium and other cations including mixtures of cations as co-activators.

In particular, the invention relates to a specific phosphor composition of the general formula $Ea_2Si_5N_8:Eu_zO_aF_b$, wherein $0.001 < z \leq 0.09$, $0.005 < a \leq 0.05$, $0.01 < b \leq 0.3$; EA is at least one earth alkaline metal chosen from the group of calcium and strontium, which exhibit a high quantum efficiency of 80-90%, high absorbance in the range from 370 nm to 470 nm of 60-80%, an emission spectrum with a peak wavelength of about 590 nm and low loss, below 10%, of the luminescent output from room temperature to 100° C. due to thermal quenching.

A specific phosphor composition of the general formula $Ea_2Si_5N_8:Eu_zO_aF_b$, wherein $0.001 < z \leq 0.09$, $0.005 < a \leq 0.05$, $0.01 < b \leq 0.3$, and EA is at least one earth alkaline metal chosen from the group of calcium and strontium, is especially valuable as the mixture of blue spectrum near 450 nm (LED) and yellow spectrum near 580 nm (phosphor) has been considered to be a white light source that shows the highest efficiency with respect to the optimization of the dichromatic radiation type in terms of true color rendition.

These phosphors may have a coating selected from the group comprising fluorides and orthophosphates of the elements aluminum, scandium, yttrium, lanthanum, gadolinium and lutetium, the oxides of aluminum, yttrium and lanthanum and the nitride of aluminum.

A further aspect of the present invention provides a method of manufacturing europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$; EA is at least one earth alkaline metal chosen from the group of calcium, barium and strontium and X is at least one halogen chosen from the group of fluorine, chlorine, bromine and iodine, said method comprising the steps of: a) mixing starting materials from at least one oxygen-containing alkaline earth precursor compound, at least one silicon nitrogen compound selected from the group comprising silicon nitride and silicon diimide, at least one europium halide, selected from the group comprising europium fluoride, europium chloride, europium bromide and europium iodide, and a reducing compound selected from the group comprising carbon and silicon, to prepare a mixture, and b) transferring the resulting mixture into a closed reactor and heat-treating the mixture under a reducing atmosphere of a mixed gas, composed of nitrogen and hydrogen.

Such a method of manufacturing provides phosphors with an increased crystal size. The phosphor material manufactured by using such an above-mentioned flux acquires excellent luminescent properties. The illumination system using this phosphor material has an improved luminescent efficiency.

The present invention focuses on a europium(II)-activated halogeno-oxonitridosilicate as a phosphor in any configuration of an illumination system containing a radiation source, including, but not limited, to discharge lamps, fluorescent lamps, LEDs, LDs and X-ray tubes. As used herein, the term "radiation" encompasses radiation in the UV, IR and visible regions of the electromagnetic spectrum.

While the use of the present phosphor is contemplated for a wide array of illumination, the present invention is described with particular reference to, and finds particular application in, light emitting diodes, especially UV- and blue-light-emitting diodes.

The fluorescent material according to the invention comprises as a phosphor a europium(II)-activated halogeno-oxonitridosilicate. The phosphor conforms to the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$, Ea is as least one earth alkaline metal chosen from the group comprising calcium, strontium and barium and X is a least one halogen selected from the group comprising fluorine, chlorine, bromine and iodine.

This class of phosphor material is based on activated luminescence of an oxygen and halogen-substituted nitridosilicate.

The phosphor of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$, comprises a host lattice with the main components of silicon and nitrogen. It also comprises oxygen and a halogen. The host lattice is supposed to have a structure consisting of (N—Si—N—) and (O—Si—N)-units in a three-dimensional network, wherein silicon is tetrahedrically surrounded by nitrogen and oxygen or halogen.

The incorporation of oxygen and halogen in the host lattice increases the proportion of covalent bonding and ligand-field splitting. As a consequence, this leads to a shift of excitation and emission bands to longer wavelengths in comparison with the basic nitridosilicate lattices.

Within the three-dimensional network, metal ions such as earth alkaline metals as well as europium(II) and eventually a co-activator are incorporated. Preferably, the earth alkaline metals are selected from calcium, strontium and barium.

The host lattice for those materials may be a six-element (two-cation) halogeno-oxonitridosilicate such as for example europium(II)-activated strontium fluoro-oxonitridosilicate $Sr_2Si_5N_8$:Eu,O,F, or it may comprise more than six elements such as for example europium(II)-activated strontium-calcium fluoro-oxonitridosilicate, e.g. $(Ca,Sr)_2Si_5N_8$:Eu,O,F.

Especially, as co-activators within the basic host lattice, substitution of trivalent rare earth metal ions for divalent earth alkaline metals is possible. When substituting earth alkaline metals Ea with rare earth metals Re, such as samarium and ytterbium, the proportion is preferably within the range of 0.2:0.8 to 0.8:0.2.

The proportion z of europium(II) is preferably in a range of $0.001 < z < 0.09$.

When the proportion z of Eu(II) is 0.001 or lower, luminance decreases because the number of excited emission centers of photoluminescence due to europium(II)-cations decreases, and when the proportion of z is greater than 0.09, density quenching occurs. Density quenching refers to the decrease in emission intensity, which occurs when the concentration of an activation agent added to increase the luminance of the fluorescent material is increased beyond an optimum level.

These europium(II)-activated halogeno-oxonitridosilicate phosphors are responsive to more energetic portions of the electromagnetic spectrum than just the visible portion of the spectrum.

In particular, the phosphors according to the invention are especially excitable by UV emission lines, which have wavelengths in the range of 200 to 420 nm, but are excited with higher efficiency by LED light emitted by a blue light emitting component having a wavelength from 400 to 480 nm. Thus, the fluorescent material has ideal characteristics for converting blue light of nitride semiconductor light emitting components into white light.

The method for producing a europium(II)-activated halogeno-oxonitridosilicate phosphor of the present invention is not particularly restricted, and said europium(II)-activated halogeno-oxonitridosilicate phosphor can be produced by firing a mixture of metal compounds which provides a europium(II)-activated halogeno-oxonitridosilicate fluorescent material.

Especially preferred however is a method of manufacturing these phosphors comprising the steps of a) mixing starting materials from at least one oxygen-containing alkaline earth precursor compound, at least one silicon nitrogen compound selected from the group comprising silicon nitride and silicon diimide, at least one europium halide, selected from the group comprising europium fluoride, europium chloride, europium bromide and europium iodide, and a reducing compound selected from the group comprising carbon and silicon, to prepare a mixture, and b) transferring the resulting mixture into a closed reactor and heat-treating the mixture under a reducing atmosphere of a mixed gas, composed of nitrogen and hydrogen.

Preferably, the oxygen-containing alkaline earth precursor compound is a carbonate, such as $CaCO_3$, $SrCO_3$ and $BaCO_3$.

Starting materials having a high purity of 99.9% or more and in the form of fine particles having an average particle size of 100 nm or less can be preferably used.

In order to augment crystallite size it is possible to incorporate a flux component in the starting material powder. The flux acts as a solvent in the solid-phase reaction and, while it is not reactive with the target oxide, it enhances substance movement by creating a very small amount of melt and enhances the reaction. Conventional fluxes such as alkali metal halides, alkaline earth metal halides, and the like, for example, calcium fluoride, strontium fluoride or barium fluoride, can be used for this purpose. Those compounds are preferably introduced into individual particles of the starting material powder or coated onto the starting material powder.

When the above-mentioned flux components are introduced into the starting material powder, a highly-crystallized oxide powder can be obtained under the same heating conditions due to the effect of the flux as a reaction enhancer. The flux components can be removed by conventional methods, such as washing after the oxide powder has been produced.

In the first place, the starting materials, i.e., at least one oxygen-containing alkaline earth precursor compound, at least one silicon nitrogen compound, at least one europium halide, and a reducing compound are well mixed by a dry and/or wet process utilizing any of various known mixing methods, such as ball mills, V-shaped mixers, stirrers and the like.

Alternatively, at least one oxygen-containing alkaline earth precursor compound and at least one europium precursor compound may be first dissolved in an aqueous solvent. The dissolved precursor compounds may then be dried and calcined to form a powder comprising a europium-doped oxygen-containing alkaline earth precursor compound.

For example, the precipitated powder may comprise (Sr, Ba)$CO_3$:Eu(III), which is then decomposed by decarboxylation in the presence of elemental carbon at a suitable temperature, such as 1000° C., to form (Sr,Ba)O:Eu(III). This powder is then mixed with a powder comprising an earth alkaline metal halide and at least one silicon nitrogen compound, at least one europium halide, and a reducing compound to form a first composite powder mixture. If desired, other starting compounds may also be added to the first composite powder mixture. Furthermore, other combinations of starting materials may also be used, if desired. For example, hydroxides of the starting materials may be precipitated and then decomposed to form oxides of the starting materials, which are then mixed with $AlF_3$ to form the blended first powder.

The blended first powder is then fired or sintered in a suitable container for between about 2 and 10 hours at 1000 to 1600° C., preferably for six hours at 1500° C., to form a sintered body or cake. Preferably, the container is an alumina crucible. According to a preferred aspect of the present invention, the alumina crucible is placed into a second container, such as a large crucible or other type of container, which contains a carbon-based fuel, such as activated charcoal. Both containers are then individually covered and placed in a furnace or adjacent to any other suitable heat source and their temperature is raised to 1000 to 1600° C. to evaporate at least a portion of the fuel to produce a weak reducing atmosphere comprising carbon, such as a carbon dioxide and/or carbon monoxide atmosphere. The reducing atmosphere penetrates the first crucible, even if it is covered, thereby enhancing the reduction process. The amount of charcoal is not critical, and may comprise from {fraction (1/10)} to ½ of the volume of the second container.

The order of the steps described above may be changed as desired.

The method for mixing the starting materials is generally a ball milling method, however it is not limited to this, and other mixing methods including hand mixing or any form of dry mixing can be applied as long as the method results in homogeneous mixing of starting materials.

The mixture obtained is placed in a heat-resistant container, such as an alumina crucible or a tungsten boat, and then fired in an electric furnace, such as a high frequency furnace or a microwave furnace. Preferably, the heat-treating temperature ranges from 1,300 to 1,700° C.

The firing atmosphere is not particularly restricted, and, for example, it is preferable to conduct firing in a reducing atmosphere, such as an atmosphere comprising inert gas, such as nitrogen and argon and the like, and hydrogen in a proportion of 0.1 to 10 volume %. Carbon may be added to the starting materials as an extra reducing agent. The firing period is determined based on various conditions, such as the amount of the mixture charged in the container, the firing temperature and the temperature at which the product is taken out of the furnace, but generally it will be in the range of 6 to 14 hours.

Fluorescent material obtained by the above-mentioned method may be ground by using, for example, a ball mill, jet mill and the like. Moreover, washing and classification may be conducted. For further enhancing the cristallinity of the resulting granular phosphor re-firing is suggested.

For example, one of the preferable compounds represented by $Sr_2Si_5N_8$:Eu,O,F is produced by the method where strontium carbonate, carbon, silicon diimide and europium(III) fluoride as the starting materials are weighed and compounded to obtain a molar ratio of Sr:Si:N:O:F:Eu of 2:2:5:8:0.05:0.27:0.09, and are then fired.

The heat-treating process in the present invention should be undertaken under a reducing atmosphere comprised of nitrogen and hydrogen, wherein Eu(III) is reduced to Eu(II).

In the heat-treating process of the present invention, the temperature of the heat treatment ranges from 1,300 to 1,700° C. When the heat-treating temperature is below 1,300° C., the required complete solid state reaction does not take place, or the resulting particle size of the phosphor is too small; whereas when the reaction temperature is above 1,700° C., in spite of the completeness of the reaction, the resulting particle size of the phosphor is too large to be applicable in LEDs. The most preferable temperature of the heat-treating process ranges from 1,550 to 1,650° C.

A series of europium-activated calcium fluoro-oxonitridosilicate powders were prepared by dispersing powders comprising 1.227 mol calcium carbonate, 5.018 mol siliconnitride, 2.456 mol carbon and 0.025 mol europium fluoride in ethanol. The powders were blended in such ratios as to prepare phosphor powders corresponding to the nominal formula $Ca_2Si_5N_8$:Eu,O,F. The slurry was dried and the blended powders were pressed to form cylindrical pellets having a diameter of 1.3 centimeters and a height of 0.75 centimeters. The pellets were sintered in a tungsten boat under nitrogen/hydrogen (95:5) using a high frequency furnace and a temperature profile with a peak temperature of about 1600° C. for about 120 minutes.

A series of europium-activated strontium fluoro-oxonitridosilicate powders were prepared by dispersing powders comprising 1.394 mol strontium carbonate, 5.816 mol siliconnitride, 2.789 mol activated charcoal and 0.058 mol europium fluoride in ethanol. The powders were blended in such ratios as to prepare phosphor powders corresponding to the nominal formula $Sr_2Si_5N_8$:Eu,O,F. The slurry was dried and the blended powders were pressed to form cylindrical pellets having a diameter of 1.3 centimeters and a height of 0.75 centimeters. The pellets were sintered in a tungsten boat under nitrogen/hydrogen (95:5) using a high frequency furnace and a temperature profile with a peak temperature of about 1600° C. for about 120 minutes.

The phosphors $Ea_2Si_5N_8$:Eu,O,F are resistant to heat, light and moisture, because of their halogeno-oxonitridosilicate structure.

Figure 3:
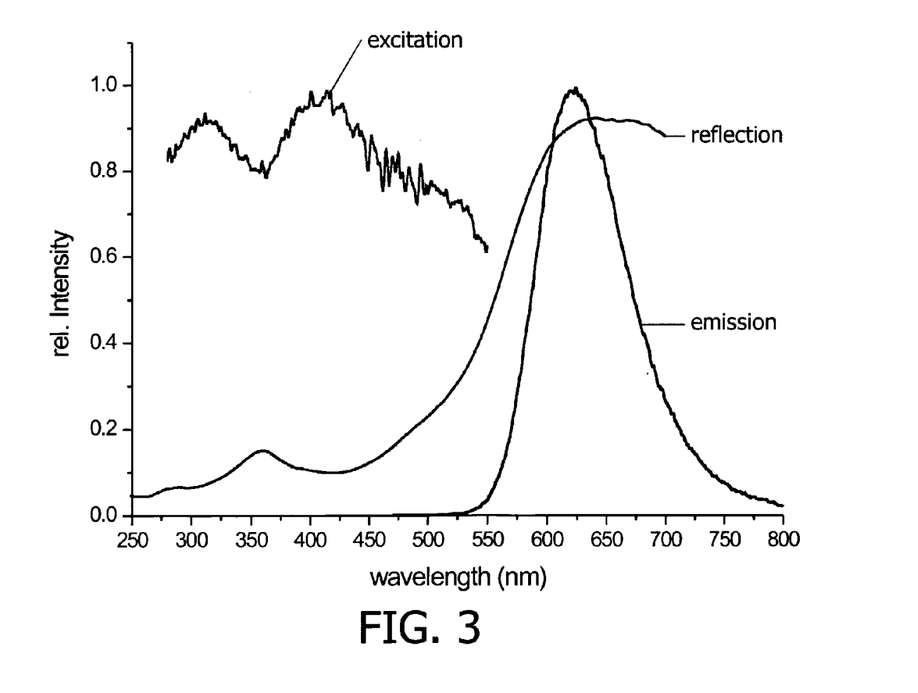
FIG. 3 shows excitation and emission spectra of $Sr_2Si_5N_8:Eu,O,F$.

The phosphor powders were characterized by powder X-ray diffraction (Cu, Kα-line), which showed that all compounds had formed. FIG. 3 shows the X-ray diffraction data of $Sr_2Si_5N_8$:Eu,O,F.

The sintered phosphors were excited using a mercury lamp generating ultraviolet light having a peak wavelength of 365 nanometers. The photoluminescence of the phosphors was measured using a Minolta model CS-100-A photometer.

Each phosphor of the europium(II)-activated halogeno-oxonitridosilicate type emits a yellow to red fluorescence when excited by radiation of the UV-A or blue range of the electromagnetic spectrum.

In FIG. 3 of the drawings accompanying this specification, the excitation and emission spectra of $Sr_2Si_5N_8$:Eu,O,F are given.

When excited with radiation of a wavelength of 468 nm, these europium(II)-activated halogeno-oxonitridosilicate phosphors are found to give a broad band emission, with a peak wavelength at 625 nm and a tail emission up to 750 nm.

From the excitation spectra, it is also clear that these europium-activated halogeno-oxonitridosilicate phosphors can be excited efficiently with radiation of a wavelength of about 325 nm as well as about 468 nm.

Preferably, the europium(II)-activated halogeno-oxonitridosilicate type phosphors according to the invention may be coated with a thin, uniform protective layer of one or more compounds selected from the group formed by the fluorides and orthophosphates of the elements aluminum, scandium, yttrium, lanthanum gadolinium and lutetium, the oxides of aluminum, yttrium and lanthanum and the nitride of aluminum.

The thickness of the protective layer customarily ranges from 0.001 to 0.2 μm and, thus, is so thin that the layer can be penetrated by the radiation from the radiation source without substantial loss of energy. The coatings of these materials on the phosphor particles can be applied, for example, by deposition from the gas phase using a wet-coating process.

The invention also concerns an illumination system comprising a radiation source and a fluorescent material comprising at least one europium-activated halogeno-oxonitridosilicate of the general formula $(RE_{1-z})_{2-a}EA_aSi_4N_{6+a}C_{1-a}:Ce_z$ wherein $1 \leq x \leq 2$; $3 \leq y \leq 7$; $0.001 < z \leq 0.09$, $0.005 < a \leq 0.05$, $0.01 < b \leq 0.3$, Ea is at least one earth alkaline metal chosen from calcium, strontium and barium.

Radiation sources include semiconductor optical radiation emitters and other devices that emit optical radiation in response to electrical excitation. Semiconductor optical radiation emitters include light emitting diode (LED) chips, light emitting polymers (LEPs), organic light emitting devices (OLEDs), polymer light emitting devices (PLEDs), etc.

Moreover, light-emitting components such as those found in discharge lamps and fluorescent lamps, such as mercury low-pressure and high-pressure discharge lamps, sulfur discharge lamps, and discharge lamps based on molecular radiators are also contemplated for use as radiation sources with the present inventive phosphor compositions.

In a preferred embodiment of the invention, the radiation source is a light-emitting diode.

Any configuration of an illumination system which includes a LED and a europium-activated halogeno-oxonitridosilicate phosphor composition is contemplated in the present invention, preferably with the addition of other well-known phosphors, which can be combined to achieve a specific color or white light when irradiated by a LED emitting primary UV or blue light as specified above.

Figure 1:
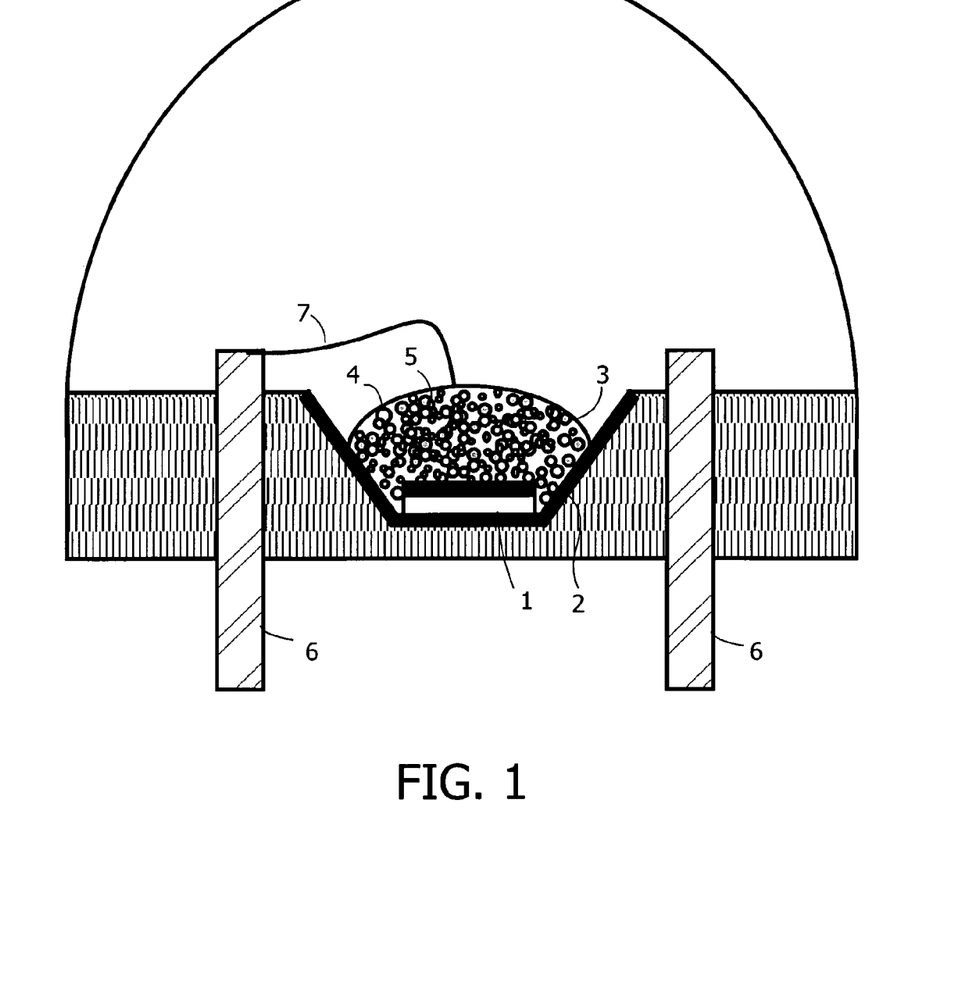
FIG. 1 shows a schematic view of a dichromatic white LED lamp comprising a phosphor of the present invention positioned in a pathway of light emitted by an LED structure.

A detailed construction of one embodiment of such an illumination system comprising a radiation source and a fluorescent material as shown in FIG. 1 will now be described.

FIG. 1 shows a schematic view of a chip-type light-emitting diode with a coating comprising the fluorescent material. The device comprises a chip-type light-emitting diode (LED) 1 as a radiation source. The light-emitting diode dice is positioned in a reflector cup lead frame 2. The dice 1 is connected via a bond wire 7 to a first terminal 6, and directly to a second electric terminal 6. The recess of the reflector cup is filled with a coating material, which contains a fluorescent material 4,5 according to the invention to form a coating layer which is embedded in the reflector cup. The phosphors are applied either separately or in a mixture.

The coating material typically comprises a polymer 3 for encapsulating the phosphor or phosphor blend. In this embodiment, the phosphor or phosphor blend should exhibit high stability against the encapsulant. Preferably, the polymer is optically clear to prevent significant light scattering. A variety of polymers for making LED lamps are known in the LED industry.

In one embodiment, the polymer is selected from the group consisting of epoxy and silicone resins. By adding the phosphor mixture to a liquid that is a polymer precursor, encapsulation can take place. For example, the phosphor mixture can be a granular powder. Introducing phosphor particles into polymer precursor liquid results in the formation of a slurry (i.e. a suspension of particles). Upon polymerization, the phosphor mixture is fixed rigidly in place by the encapsulation. In one embodiment, both the fluorescent material and the LED dice are encapsulated in the polymer.

The transparent coating material may comprise light-diffusing particles, advantageously so-called diffusers. Examples of such diffusers are mineral fillers, in particular $CaF_2$, $TiO_2$, $SiO_2$, $CaCO_3$ or $BaSO_4$ or alternatively organic pigments. These materials can be added in a simple manner to the above-mentioned resins.

In operation, electrical power is supplied to the dice to activate them. When activated, the dice emit primary light, e.g. blue light. A portion of the emitted primary light is completely or partially absorbed by the fluorescent material in the coating layer. The fluorescent material then emits secondary light, i.e., the converted light having a longer peak wavelength; said secondary light being primarily yellow and being emitted in a sufficiently broad band (specifically with a significant proportion of red) in response to absorption of the primary light. The remaining unabsorbed portion of the emitted primary light is transmitted through the fluorescent layer, along with the secondary light. The encapsulation directs the unabsorbed primary light and the secondary light in a general direction as output light. Thus, the output light is a composite light that is composed of the primary light emitted from the die and the secondary light emitted from the fluorescent layer.

The color points corresponding to a black body at various temperatures are given by the black body point (BBL). Because the color emitted from a black body is considered to be white, and white light is generally desirable for a lamp, it is generally desirable that the color points of the light emitted from the luminescent material of a luminescent lamp fall on or near the BBL in the chromaticity diagram of the Commission international de l'Eclairage ("CIE").

Figure 4:
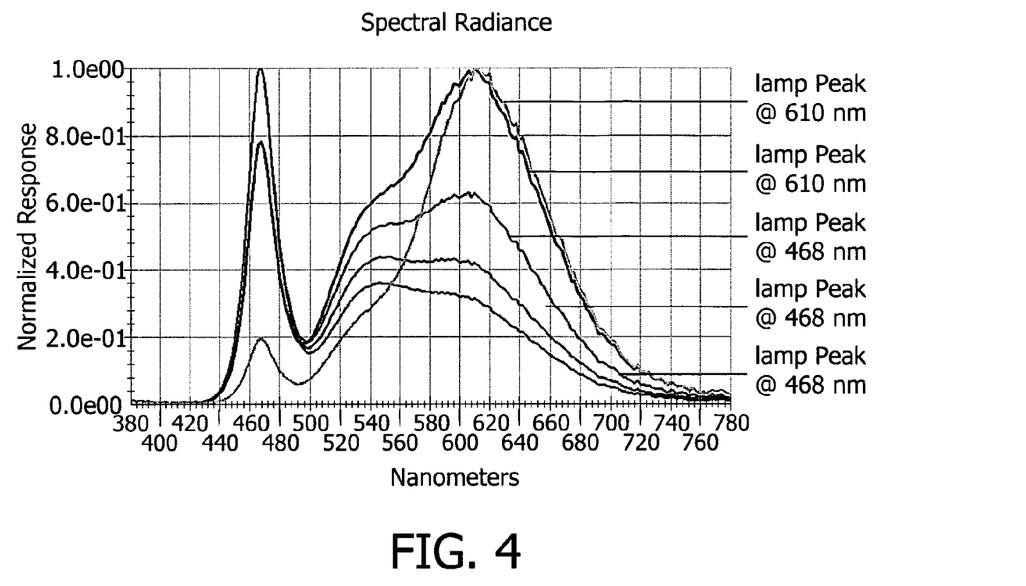
FIG. 4 shows the spectral radiance of an illumination source comprising a blue LED and $(Ba,Sr)Si_5N_8:Eu,O,F$ and YAG-Ce as fluorescent material.
Figure 5:
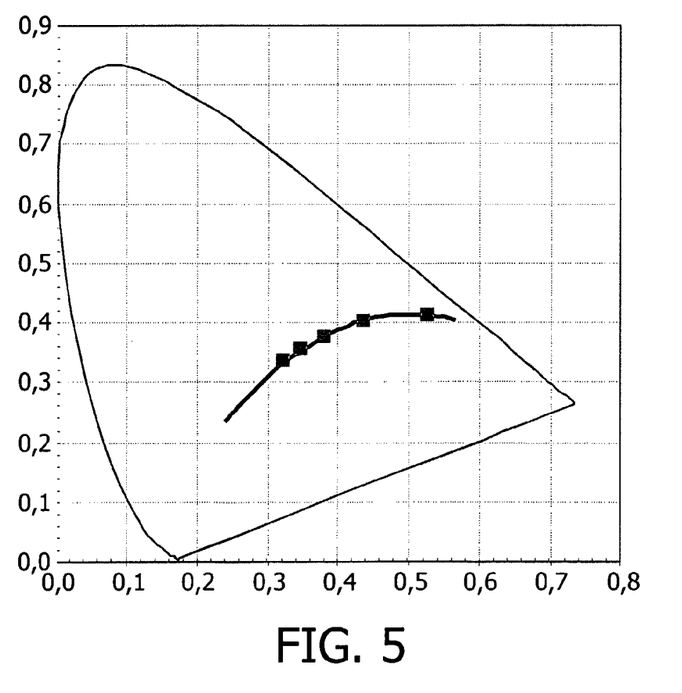
FIG. 5 shows the coordinates of the radiation of a white LED comprising a blue LED at 468 nm and $Ba_2Si_5N_8:Eu,O,F$ plus $SrSi_2N_2O_2:Eu$ as fluorescent material in the chromaticity diagram of the Commission International de l'Eclairage ("CIE").

A chromaticity diagram is shown in FIG. 5 with five color temperature points highlighted on the BBL corresponding to white light-emitting LEDs, whose emission spectra are given in FIG. 4.

The color temperature or color point of the output light of an illumination system according to the invention will vary depending upon the spectral distribution and intensity of the secondary light in comparison with the primary light.

Firstly, the color temperature or color point of the primary light can be varied by a suitable choice of the light emitting diode Secondly, the color temperature or color point of the secondary light can be varied by a suitable choice of the phosphor in the luminescent material, its particle size and its concentration. Furthermore, these choices also advantageously enable the use of phosphor blends in the luminescent material, as a result of which, advantageously, the desired hue can be set even more accurately.

According to one aspect of the invention, the output light may have a spectral distribution such that it appears to be "white" light.

In a first embodiment, a white-light emitting illumination system according to the invention can advantageously be produced by choosing the luminescent material such that a blue radiation emitted by a blue light emitting diode is converted into complementary wavelength ranges, to form dichromatic white light. In this case, yellow light is produced by means of the luminescent materials that comprise a europium-activated halogeno-oxonitridosilicate phosphor. Also a second red fluorescent material can additionally be used in order to improve the color rendition of this illumination system.

Particularly good results are achieved with a blue LED whose emission maximum lies at 400 to 480 nm. An optimum has been found to lie at 445 to 468 nm, taking particular account of the excitation spectrum of the europium-activated halogeno-oxonitridosilicate.

A white-light emitting illumination system according to the invention can particularly preferably be realized by admixing the inorganic luminescent material $(Ba,Sr)_2Si_5N_8$:Eu,O,F with a silicon resin used to produce the luminescence conversion encapsulation or layer.

Part of a blue radiation emitted by a 468 nm InGaN light emitting diode is shifted by the inorganic luminescent material $(Ba,Sr)_2Si_5N_8$:Eu,O,F into the yellow spectral region and, consequently, into a wavelength range which is complementarily colored with respect to the color blue. A human observer perceives the combination of blue primary light and the secondary light of the yellow-emitting phosphor as white light.

The hue (color point in the CIE chromaticity diagram) of the white light thus produced can in this case be varied by a suitable choice of the phosphor in respect of mixture and concentration, see Table 2.

Table 1: Color point x, y and color rendering (Ra8) of white LEDs comprising a blue emitting die (462 nm) and a yellow phosphor $(Sr_2Si_5N_8$:Eu,O,F) as a function of color temperature T,

| $T_c$ [K] | x | y | $Ra_8$ |
|---|---|---|---|
| 2870 | 0.470 | 0.452 | 74 |
| 2960 | 0.454 | 0.433 | 76 |
| 3100 | 0.434 | 0.411 | 78 |
| 3320 | 0.411 | 0.383 | 81 |
| 3720 | 0.382 | 0.349 | 84 |
| 4780 | 0.345 | 0.306 | 83 |
| 5490 | 0.332 | 0.290 | 80 |

Figure 2:
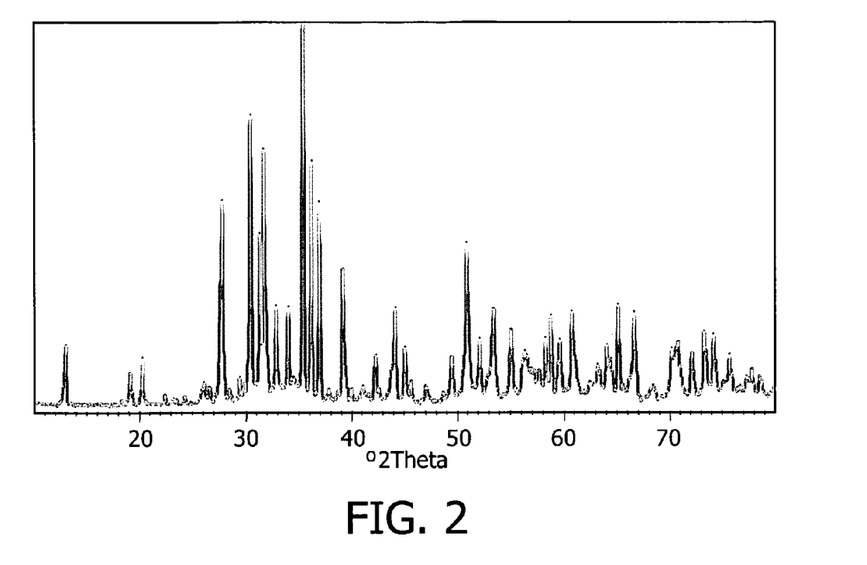
FIG. 2 shows an XRD pattern of $Sr_2Si_5N_8:Eu,O,F$ measured by Cu Kα radiation.

Said white light illumination device has color coordinates substantially at a black body point of a CIE chromaticity diagram as shown in FIG. 2.

Figure 6:
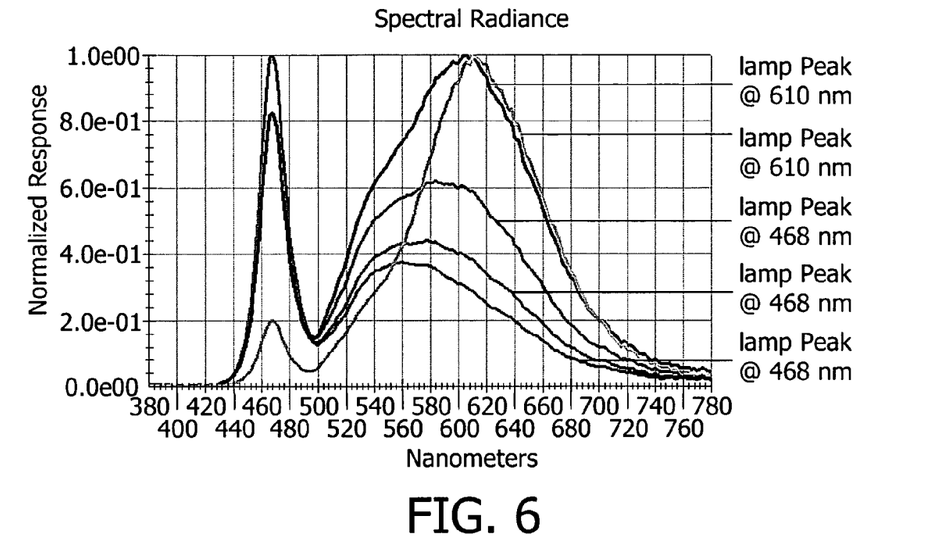
FIG. 6 shows the spectral radiance of an illumination source comprising a blue emitting InGaN die with primary emission at 462 nm and $Sr_2Si_5N_8:Eu,O,F$ as the fluorescent material.
Figure 7:
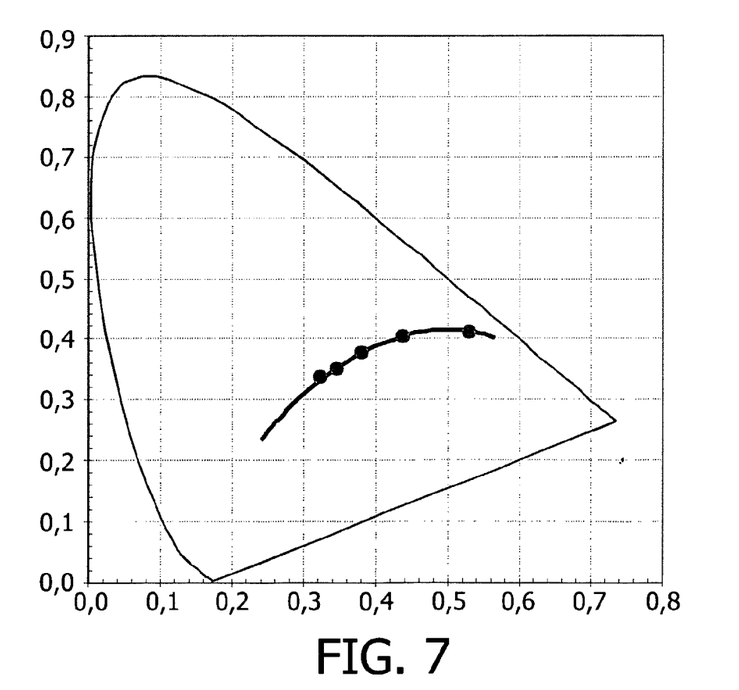
FIG. 7 shows the coordinates of the radiation of a white LED comprising a blue emitting InGaN die with primary emission at 462 nm and $Sr_2Si_5N_8:Eu,O,F$ as the fluorescent material in the chromaticity diagram of the Commission International de l'Eclairage ("CIE").

FIGS. 6 and 7 show the emission spectra of such an illumination system comprising a blue emitting InGaN die with primary emission at 462 nm and $Sr_2Si_5N_8$:Eu,O,F as the fluorescent material, which together form an overall spectrum which conveys a white color sensation of high quality. The associated color points for different coating thicknesses are x=0.454, y=0.433 at color temperature $T_c$=2960 Kelvin, CRI 76; x=0.382 and y=0.349 at color temperature $T_c$=3720 Kelvin, CRI=84. and x=0.332, y=0.290 at color temperature 5490, CRI=80.

When compared with the spectral distribution of the white output light generated by the prior art LED of Shimizu et al., (FIG. 8), the apparent difference in spectral distribution is the shift of the peak wavelength, which is in the red region of the visible spectrum. Thus, the white output light generated by the illumination system has a significant additional amount of red color, as compared to the output light generated by the prior art LED of Shimizu et al.

In a second embodiment, a white-light emitting illumination system according to the invention can advantageously be produced by choosing the luminescent material such that blue radiation emitted by the blue light emitting diode is converted into complementary wavelength ranges, to form polychromatic white light. In this case, yellow light is produced by means of the luminescent materials that comprise a blend of phosphors including europium-activated halogeno-oxonitridosilicate phosphor and a second phosphor.

White light emission with even higher color rendering is possible by using red and green broad band emitter phosphors covering the whole spectral range together with a blue-emitting LED and a yellow to red emitting europium-activated halogeno-oxonitridosilicate phosphor.

Useful second phosphors and their optical properties are summarized in table 2 below:

| Composition | $\lambda_{max}$ [nm] | Color point x, y |
| --- | --- | --- |
| $(Ba_{1-x}Sr_x)_2SiO_4$:Eu | 523 | 0.272, 0.640 |
| $SrGa_2S_4$:Eu | 535 | 0.270, 0.686 |
| $SrSi_2N_2O_2$:Eu | 541 | 0.356, 0.606 |
| SrS:Eu | 610 | 0.627, 0.372 |
| $(Sr_{1-x-y}Ca_xBa_y)_2Si_5N_8$:Eu | 615 | 0.615, 0.384 |
| $(Sr_{1-x-y}Ca_xBa_y)_2Si_{5-x}Al_xN_{8-x}O_x$:Eu | 615-650 | * |
| CaS:Eu | 655 | 0.700, 0.303 |
| $(Sr_{1-x}Ca_x)S$:Eu | 610-655 | * |

The luminescent materials may be a blend of two phosphors, i.e. a yellow to red europium activated halogeno-oxonitridosilicate phosphor and a red phosphor selected from the group comprising $(Ca_{1-x}Sr_x)S$:Eu, wherein $0 \leq x \leq 1$ and $(Sr_{1-x-y}Ba_xCa_y)_{2-z}Si_{5-a}Al_aN_{8-a}O_a$:Eu$_z$, wherein $0 \leq a<5$, $0<x \leq 1$, $0 \leq y \leq 1$ and $0<z \leq 0.09$.

The luminescent materials may be a blend of two phosphors, i.e. a yellow to red europium activated halogeno-oxonitridosilicate phosphor and a yellow to green phosphor selected from the group comprising $(Ba_{1-x}Sr_x)_2SiO_4$:Eu, wherein $0 \leq x \leq 1$, $SrGa_2S_4$:Eu, $SrSi_2N_2O_2$:Eu, $Ln_3Al_5O_{12}$:Ce and YAG-Ce.

The luminescent materials may be a blend of three phosphors, i.e. a yellow to red europium activated halogeno-oxonitridosilicate phosphor, a red phosphor selected from the group comprising $(Ca_{1-x}Sr_x)S$:Eu, wherein $0 \leq x \leq 1$ and $(Sr_{1-x-y}Ba_xCa_y)_{2-z}Si_{5-a}Al_aN_{8-a}O_a$:Eu$_z$, wherein $0 \leq a<5$, $0<x \leq 1$, $0 \leq y \leq 1$ and $0<z \leq 0.09$, and a yellow to green phosphor selected from the group comprising $(Ba_{1-x}Sr_x)_2SiO_4$:Eu, wherein $0 \leq x \leq 1$, $SrGa_2S_4$:Eu, $SrSi_2N_2O_2$:Eu, $Ln_3Al_5O_{12}$:Ce and YAG-Ce.

In the example given, a white-light emitting illumination system according to the invention can particularly preferably be realized by admixing the inorganic luminescent material comprising a mixture of three phosphors with a silicon resin used to produce the luminescence conversion encapsulation or layer. A first phosphor (1) is the yellow-emitting halogeno-oxonitridosilicate $Sr_2Si_5N_8$:Eu,O,F, the second phosphor (2) is the red-emitting CaS:Eu, and the third (3) is a green-emitting phosphor of type $SrSi_2N_2O_2$:Eu.

Part of blue radiation emitted by a 462 nm InGaN light emitting diode is shifted by the inorganic luminescent material $Sr_2Si_5N_8$:Eu,O,F into the yellow spectral region and, consequently, into a wavelength range which is complementarily colored with respect to the color blue. Another part of blue radiation emitted by a 462 nm InGaN light emitting diode is shifted by the inorganic luminescent material CaS:Eu into the red spectral region. Still another part of blue radiation emitted by a 462 nm InGaN light emitting diode is shifted by the inorganic luminescent material $SrSi_2N_2O_2$:Eu into the green spectral region. A human observer perceives the combination of blue primary light and the polychromatic secondary light of the phosphor blend as white light.

The hue (color point in the CIE chromaticity diagram) of the white light thus produced can in this case be varied by a suitable choice of the phosphors in respect of mixture and concentration.

In a third embodiment, a white-light emitting illumination system according to the invention can advantageously be produced by choosing the luminescent material such that UV radiation emitted by the UV light emitting diode is converted into complementary wavelength ranges, to form dichromatic white light. In this case, the yellow and blue light is produced by means of the luminescent materials. Yellow light is produced by means of the luminescent materials that comprise a europium-activated halogeno-oxonitridosilicate phosphor. Blue light is produced by means of the luminescent materials that comprise a blue phosphor selected from the group comprising $BaMgAl_{10}O_{17}$:Eu, $Ba_5SiO_4(Cl,Br)_6$:Eu, $CaLn_2S_4$:Ce, $(Sr,Ba,Ca)_5(PO_4)_3Cl$:Eu and $LaSi_3N_5$:Ce.

Particularly good results are achieved in conjunction with a UVA light emitting diode, whose emission maximum lies at 300 to 420 nm. An optimum has been found to lie at 365 nm, taking particular account of the excitation spectrum of the halogeno-oxonitridosilicate.

In a fourth embodiment, a white-light emitting illumination system according to the invention can advantageously be produced by choosing the luminescent material such that UV radiation emitted by a UV emitting diode is converted into complementary wavelength ranges, to form polychromatic white light e.g. by additive color triads, for example blue, green and red.

In this case, the yellow to red and the green and blue light is produced by means of the luminescent materials.

Also a second red fluorescent material can be used, in addition, in order to improve the color rendition of this illumination system.

White light emission with even higher color rendering is possible by using blue and green broad band emitter phosphors covering the whole spectral range together with a UV emitting LED and a yellow to red emitting europium-activated halogeno-oxonitridosilicate phosphor.

The luminescent materials may be a blend of three phosphors, i.e. a yellow to red europium activated halogeno-oxonitridosilicate phosphor, a blue phosphor selected from the group comprising BaMgAl$_{10}$O$_{17}$:Eu, Ba$_5$SiO$_4$(Cl,Br)$_6$:Eu, CaLn$_2$S$_4$:Ce, (Sr,Ba,Ca)$_5$(PO$_4$)$_3$Cl:Eu and LaSi$_3$N$_5$:Ce, and a yellow to green phosphor selected from the group comprising (Ba$_{1-x}$Sr$_x$)$_2$SiO$_4$:Eu, wherein 0≦x≦1, SrGa$_2$S$_4$:Eu, SrSi$_2$N$_2$O$_2$:Eu, Ln$_3$Al$_5$O$_{12}$:Ce and YAG:Ce.

The hue (color point in the CIE chromaticity diagram) of the white light thus produced can in this case be varied by a suitable choice of the phosphors in respect of mixture and concentration.

According to a further aspect of the invention, an illumination system that emits output light having a spectral distribution such that it appears to be "yellow to red" light is contemplated.

Fluorescent material comprising europium activated halogeno-oxonitridosilicate as the phosphor is particularly well suited, as a yellow component, for stimulation by a primary UVA or blue radiation source such as, for example, an UVA-emitting LED or blue-emitting LED.

It is possible then to implement an illumination system emitting in the yellow to red regions of the electromagnetic spectrum.

In a fifth embodiment, a yellow-light emitting illumination system according to the invention can advantageously be produced by choosing the luminescent material such that blue radiation emitted by the blue light emitting diode is converted into complementary wavelength ranges, to form dichromatic yellow light.

In this case, yellow light is produced by means of the luminescent materials that comprise a europium-activated halogeno-oxonitridosilicate phosphor.

Particularly good results are achieved with a blue LED whose emission maximum lies at 400 to 480 nm. An optimum has been found to lie at 445 to 465 nm, taking particular account of the excitation spectrum of the halogen-oxonitridosilicate.

A yellow-light emitting illumination system according to the invention can particularly preferably be realized by admixing an excess of the inorganic luminescent material Sr$_2$Si$_5$N$_8$:Eu,O,F with a silicon resin used to produce the luminescence conversion encapsulation or layer. Part of blue radiation emitted by a 462 nm InGaN light emitting diode is shifted by the inorganic luminescent material Sr$_2$Si$_5$N$_8$:Eu,O,F into the yellow spectral region and, consequently, into a wavelength range which is complementarily colored with respect to the color blue. A human observer perceives the combination of blue primary light and the excess secondary light of the yellow-emitting phosphor as yellow light.

The color output of the LED-phosphor system is very sensitive to the thickness of the phosphor layer, i.e. if the phosphor layer is thick and comprises an excess of a yellow europium activated halogeno-oxonitridosilicate phosphor, then a smaller amount of the blue LED light will penetrate through the thick phosphor layer. The combined LED-phosphor system will then appear yellow to red, because it is dominated by the yellow to red secondary light of the phosphor. Therefore, the thickness of the phosphor layer is a critical variable affecting the color output of the system.

The hue (color point in the CIE chromaticity diagram) of the yellow light thus produced can in this case be varied by a suitable choice of the phosphor in respect of mixture and concentration.

In a sixth embodiment, a white-light emitting illumination system according to the invention can advantageously be produced by choosing the luminescent material such that UV radiation emitted by the UV emitting diode is converted entirely into monochromatic yellow to red light. In this case, the yellow to red light is produced by means of the luminescent materials.

A yellow-light emitting illumination system according to the invention can particularly preferably be realized by admixing the inorganic luminescent material Sr$_2$Si$_5$N$_8$:Eu,O,F with a silicon resin used to produce the luminescence conversion encapsulation or layer. Part of blue radiation emitted by a 462 nm InGaN light emitting diode is shifted by the inorganic luminescent material Sr$_2$Si$_5$N$_8$:Eu,O,F into the yellow spectral region. A human observer perceives the combination of UVA primary radiation and the secondary light of the yellow-emitting phosphor as yellow light.

The hue (color point in the CIE chromaticity diagram) of the white light thus produced can in this case be varied by a suitable choice of the phosphor in respect of mixture and concentration.

The invention claimed is:

1. Illumination system comprising a radiation source and a fluorescent material comprising at least one phosphor capable of absorbing part of the light emitted by the radiation source and emitting light of a wavelength different from that of the absorbed light, wherein said at least one phosphor is a europium(II)-activated halogeno-oxonitridosilicate of the general formula Ea$_x$Si$_y$N$_{2/3x+4/3y}$:Eu$_z$O$_a$X$_b$, wherein 1≦x≦2; 3≦y≦7; 0.001<z≦0.09, 0.005<a≦0.05, 0.01<b≦0.3, EA is at least one earth alkaline metal chosen from the group of calcium, barium and strontium and X is at least one halogen chosen from the group of fluorine, chlorine, bromine and iodine.

2. Illumination system according to claim 1, wherein the radiation source is a light emitting diode.

3. Illumination system according to claim 1, wherein the radiation source is selected from the light emitting diodes having an emission with a peak wavelength in the range of 400 to 480 nm and wherein the fluorescent material comprises a europium(II)-activated halogeno-oxonitridosilicate of the general formula Ea$_x$Si$_y$N$_{2/3x+4/3y}$:Eu$_z$O$_a$X$_b$, wherein 1≦x≦2; 3≦y≦7; 0.001<z≦0.09, 0.005<a≦0.05, 0.01<b≦0.3, EA is at least one earth alkaline metal chosen from the group of calcium, barium and strontium and X is at least one halogen chosen from the group of fluorine, chlorine, bromine and iodine.

4. Illumination system according to claim 1, wherein the radiation source is selected from the light emitting diodes having an emission with a peak wavelength in the range of 400 to 480 nm and the fluorescent material comprises a europium(II)-activated halogeno-oxonitridosilicate of the general formula Ea$_x$Si$_y$N$_{2/3x+4/3y}$:Eu$_z$O$_a$X$_b$, wherein 1≦x≦2; 3≦y≦7; 0.001<z≦0.09, 0.005<a≦0.05, 0.01<b≦0.3, EA is at least one earth alkaline metal chosen from the group of calcium, barium and strontium and X is at least one halogen chosen from the group of fluorine, chlorine, bromine and iodine and a second phosphor.

5. Illumination system according to claim 4, wherein the second phosphor is a red phosphor selected from the group comprising (Ca$_{1-x}$Sr$_x$)S:Eu, wherein 0≦x≦1 and (Sr$_{1-x-y}$Ba$_x$Ca$_y$)$_{2-z}$Si$_{5-a}$Al$_a$N$_{8-a}$O$_a$:Eu$_z$, wherein 0≦a<5, 0<x≦1, 0≦y≦1 and 0<z≦0.09.

6. Illumination system according to claim 4, wherein the second phosphor is a green phosphor selected from the group comprising (Ba$_{1-x}$Sr$_x$)$_2$SiO$_4$:Eu, wherein 0≦x≦1, SrGa$_2$S$_4$:Eu, SrSi$_2$N$_2$O$_2$:Eu, Ln$_3$Al$_5$O$_{12}$:Ce and YAG-Ce.

7. Illumination system according to claim 1, wherein the radiation source is selected from the light emitting diodes having an emission with a peak wavelength in the UV range of 200 to 420 nm and wherein the fluorescent material comprises a europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$, EA is at least one earth alkaline metal chosen from the group of calcium, barium and strontium and X is at least one halogen chosen from the group of fluorine, chlorine, bromine and iodine.

8. Illumination system according to claim 1, wherein the radiation source is selected from the light emitting diodes having an emission with a peak wavelength in the UV-range of 200 to 420 nm and wherein the fluorescent material comprises europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$, EA is at least one earth alkaline metal chosen from the group of calcium, barium and strontium and X is at least one halogen chosen from the group of fluorine, chlorine, bromine and iodine and a second phosphor.

9. Illumination system according to claim 8, wherein the second phosphor is a blue phosphor selected from the group comprising $BaMgAl_{10}O_7:Eu$, $Ba_5SiO_4(Cl,Br)_6:Eu$, $CaLn_2S_4:Ce$, $(Sr,Ba,Ca)_5(PO_4)_3Cl:Eu$ and $LaSi_3N_5:Ce$.

10. Illumination system according to claim 8, wherein the second phosphor is a red phosphor selected from the group comprising $Ca_{1-x}Sr_x)S:Eu$, wherein $0 \leq x \leq 1$ and $(Sr_{1-x-y}Ba_xCa_y)_{2-z}Si_{5-a}Al_aN_{8-a}O_a:Eu_z$, wherein $0 \leq a < 5$, $0 \leq x \leq 1$, $0 \leq y \leq 1$ and $0 < z \leq 0.09$.

11. Illumination system according to claim 8, wherein the second phosphor is a yellow to green phosphor selected from the group comprising $(Ba_{1-x}Sr_x)_2SiO_4:Eu$, wherein $0 \leq x \leq 1$, $SrGa_2S_4Eu$, $SrSi_2N_2O_2:Eu$, $Ln_3Al_5O_{12}:Ce$ and YAG-Ce.

12. Phosphor capable of absorbing part of the light emitted by the radiation source and emitting light of a wavelength different from that of the absorbed light, wherein said phosphor is a europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$, EA is at least one earth alkaline metal chosen from the group of calcium, barium and strontium and X is at least one halogen chosen from the group of fluorine, chlorine, bromine and iodine.

13. Phosphor according to claim 12, wherein said phosphor additionally comprises a co-activator selected from the group comprising ytterbium and samarium.

14. Phosphor according to claim 12, wherein said phosphor is a europium-activated halogeno-oxonitridosilicate of the general formula $Ea_2Si_5N_8:Eu_zO_aF_b$, wherein $0.001 < z \leq 0.09$, $0.005 < a \leq 0.05$, $0.01 < b \leq 0.3$, EA is at least one earth alkaline metal chosen from the group comprising calcium and strontium.

15. Phosphor according to claim 12, wherein the phosphor has a coating selected from the group comprising fluorides and orthophosphates of the elements aluminum, scandium, yttrium, lanthanum gadolinium and lutetium, the oxides of aluminum, yttrium and lanthanum and the nitride of aluminum.

16. A method for preparing europium(II)-activated halogeno-oxonitridosilicate of the general formula $Ea_xSi_yN_{2/3x+4/3y}:Eu_zO_aX_b$, wherein $1 \leq x \leq 2$; $3 \leq y \leq 7$; $0.001 < z \leq 0.09$, $0.005 < a \leq 0.05$, $0.01 < b \leq 0.3$, EA is at least one earth alkaline metal chosen from the group comprising calcium, barium and strontium and X is at least one halogen chosen from the group of fluorine, chlorine, bromine and iodine, said method comprising: a) mixing starting materials from at least one oxygen-containing alkaline earth precursor compound, at least one silicon nitrogen compound selected from the group comprising silicon nitride and silicon diimide, at least one europium precursor compound and a reducing compound selected from the group comprising carbon and silicon, to prepare a mixture, and b) transferring the resulting mixture into a closed reactor and heat-treating the mixture under a reduced atmosphere of a mixed gas, composed of nitrogen and hydrogen.

17. The method of claim 16, wherein the oxygen-containing alkaline earth precursor compound is a carbonate.

18. The method of claim 16, wherein the starting material comprises also a flux, selected from the halide of the earth alkaline metals.

19. The method of claim 16, wherein the europium precursor compound is a halide, selected from the group comprising europium fluoride, europium chloride, europium bromide and europium iodide.

20. The method of claim 16, wherein the europium precursor compound is a europium(II)-doped earth alkaline metal oxide.

21. The method of claim 1, wherein the heat-treating temperature ranges from 1,300 to 1,700° C.

\* \* \* \* \*